Jan. 1, 1929.  K. FORBES  1,697,814

GROMMET

Filed Dec. 12, 1925

Inventor
KINGSTON FORBES

Patented Jan. 1, 1929.

1,697,814

UNITED STATES PATENT OFFICE.

KINGSTON FORBES, OF FLINT, MICHIGAN, ASSIGNOR TO GENERAL MOTORS CORPORATION, OF DETROIT, MICHIGAN, A CORPORATION OF DELAWARE.

GROMMET.

Application filed December 12, 1925. Serial No. 75,148.

This invention relates to a device for supporting wires, rods, or like connections against vibration and rattle.

As an adaptation of the device, an automobile might be referred to as being one of many constructions in which the invention may be used. The automobile is provided with electric wires, choke rods, cables, oil pipes, and various other connections which extend through parts of the body, dash, or other parts of the car. When such connections are extended through these parts and especially when such parts are of thin metal, the connections vibrate causing noise and wear; the latter being very objectionable particularly with electrical connections as the insulation becomes worn and the connections, if electrical, short circuited.

To overcome this difficulty, a rubber grommet is ordinarily interposed between the part through which the connection passes and the connection itself thereby serving as an insulator and preventing wear. To prevent vibration within the grommet and to entirely eliminate any vibration and rattle, the grommet is further provided with a novel means shown as a resilient web which grips the connection within the grommet. By such a construction the opening through which the connection passes is sealed preventing the admittance of moisture or air.

The grommet is secured in position by novel means and constructed in such a manner as to permit easy application. The construction of the device will be better understood from the accompanying drawings, in which.

Figure 1:
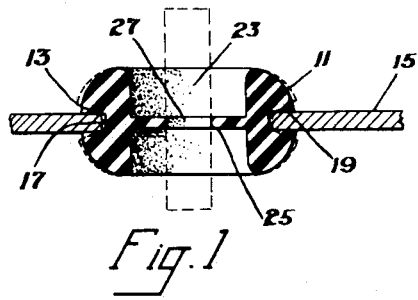
Figure 1 is a sectional view through the grommet applied to a support.
Figure 2:
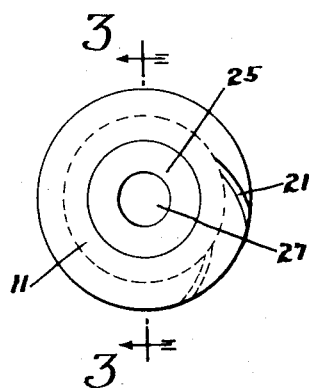
Figure 2 is a plan view of the device.
Figure 3:
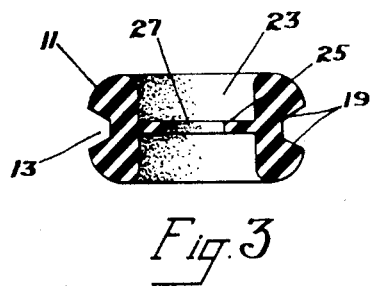
Figure 3 is a sectional view of Figure 2 taken on line 3—3.

Referring to the drawings, illustrating one form of the device, a rubber body portion 11 is provided with a groove 13, in the outer periphery thereof, adapted to engage an opening 17 in the support 15. The opening 17 is preferably of less diameter than the diameter at the bottom of the groove 13. The side walls 19 of the groove are shown tapered forming a V-shaped groove. A spiral slot 21 is extended from one wall of the groove, preferably the lower wall, to the outer surface of the body portion to form a means for applying the grommet or for threading the same within the opening 17. The grommet is placed over the opening and by a little downward pressure with a slight turn it is in a position as shown in Figure 1. The bottom portion of the groove is compressed due to the difference in diameter between the opening and the bottom of the groove, causing the side walls 19 to draw together as shown in full lines of Figure 1; the dotted lines being the shape of the device before applied to the support. By securing the device in this manner the surfaces are all properly sealed without any additional parts or any buckling of the body portion and it is firmly held within the support.

The body portion 11 is shown provided with an opening 23 to receive the wires or other connections. Extending inwardly from the inner periphery of the opening is a web or tongue 25 of thin resilient material such as rubber and preferably integral with the body portion. The web is shown having a small opening 27 to receive and grip the connection extending therethrough. If desired, the opening 27 may be omitted leaving the web 25 to be pierced by the connection when it is extended through the device.

By the use of such a resilient member the connections are frictionally held within the support in such a manner that vibration and rattle are prevented. The connections are easily inserted and the device is inexpensive.

While one illustrative embodiment of my invention has been described, various changes in construction such as size, shape, and material may be made without departing from the spirit of the invention, and it is not my intention to limit its scope by the description, or otherwise than by the terms of the appended claims.

I claim:

1. An annular grommet of elastic material having in its outer periphery an annular groove adapted to embrace a support, and also having on the inner periphery thereof an inwardly extending annular flexible tongue adapted to exercise a yielding pressure against a member passing through the opening thereof.

2. An article of manufacture comprising a resilient body portion having an opening to receive connections, a V-shaped groove in the outer periphery of said body portion, and a spiral slot connecting the groove with the outer surface of said body portion.

3. In a device of the class described comprising, in combination, a support having an opening, a body portion within said opening having a central opening and a groove having oppositely tapered walls, the bottom of said groove having a diameter greater than the diameter of the opening in said support, and means for resiliently supporting a connection within the opening.

4. An article of manufacture comprising a resilient annular body portion having a central opening, a portion of reduced thickness extending inwardly from the inner periphery of said opening and having an opening of less diameter than the opening in said body portion adapted to receive and resiliently grip a wire to retain the same against vibration and rattle, and means on said body portion for retaining the same in position.

5. In a device of the class described comprising, in combination, a support provided with an opening, a body portion of resilient material having a central opening, a portion of reduced thickness extending inwardly from the inner periphery of said opening adapted to frictionally grip a connection to retain the same against vibration and rattle, a V-shaped groove in the outer periphery of said body portion, the walls of said groove being tapered outwardly and the bottom having a diameter less than the opening in said support to receive said groove, and a spiral slot connecting one wall of the groove with the outer surface of said body portion.

6. The combination with a member having an opening therein, and a member to be supported thereby, of a bushing of elastic material surrounding the member to be supported and insertible within said opening, and having an external groove adapted to straddle the edge of the opening, the diameter of the groove bottom being greater than that of the opening, whereby the elastic bushing is placed under compression to hold the same within the opening.

7. The combination with a member having an opening therein, and a member to be supported thereby, of a bushing of elastic material surrounding the member to be supported and insertible within said opening, and having a peripheral depression with divergent side walls to straddle the edge of the opening, said opening being of smaller size than said bushing, whereby upon insertion within the opening the bushing is placed under compression and the divergent side walls of the depression are drawn into frictional hugging contact with portions of the supporting member adjacent the opening.

8. An article of manufacture comprising a body of inherently elastic material having a rim portion adapted to be secured by its inherent elasticity to a support, and an integral web extending inwardly from the rim portion, and provided with an opening adapted to receive a member to be supported, the inherent elasticity of the material permitting the web to yield to allow reception of a member of larger size than the opening therein.

9. An article of manufacture, including an annular body portion of elastic material having an integral elastic portion of reduced thickness extending inwardly therefrom and adapted to resiliently hug a part projecting therethrough.

In testimony whereof I affix my signature.

KINGSTON FORBES.